(12) United States Patent
Payne et al.

(10) Patent No.: US 11,640,529 B2
(45) Date of Patent: May 2, 2023

(54) TRAINING A NEURAL NETWORK TO CREATE AN EMBEDDING FOR AN UNLABELED VERTEX IN A HYPERGRAPH

(71) Applicant: International Business Machines Corporation, Armonk, NY (US)

(72) Inventors: Joshua Payne, San Antonio, TX (US); Arjun Natarajan, Old Tappan, NJ (US)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 16/792,277

(22) Filed: Feb. 16, 2020

(65) Prior Publication Data

US 2021/0256368 A1    Aug. 19, 2021

(51) Int. Cl.
*G06N 3/08*     (2023.01)
*G06N 3/04*     (2023.01)

(52) U.S. Cl.
CPC ............... *G06N 3/08* (2013.01); *G06N 3/04* (2013.01)

(58) Field of Classification Search
CPC .......... G06N 3/08; G06N 3/04; G06N 20/00; G06N 5/04; G06N 3/0454; G06N 5/025; G06N 20/20
USPC ...... 706/706, 19 OR, 46 OR, 23 OR, 47 OR, 706/16
See application file for complete search history.

(56) References Cited

U.S. PATENT DOCUMENTS

2018/0336467 A1* 11/2018 Guttmann ............. H04L 63/102
2019/0005395 A1*  1/2019 Dutkowski ........... G06T 11/206
2019/0206066 A1   7/2019 Saleemi et al.

OTHER PUBLICATIONS

P. Mell et al., "The NIST Definition of Cloud Computing", National Institute of Standards and Technology, Information Technology Laboratory, Sep. 2011, pp. 1-7.
J. Bu, S. Tan, C. Chen, C. Wang, H. Wu, L. Zhang, and X. He, "Music recommendation by unified hypergraph: combining social media information and music content," in Proceedings of the 18th ACM international conference on Multimedia. ACM, 2010, pp. 391-400.
S. Klamt, U.-U. Haus, and F. Theis, "Hypergraphs and cellular networks," PLoS computational biology, vol. 5, No. 5, p. e1000385, 2009.

(Continued)

*Primary Examiner* — Evan Aspinwall
(74) *Attorney, Agent, or Firm* — Scott S. Dobson

(57) ABSTRACT

A method creates an embedding for an unlabeled vertex in a hypergraph. The method includes receiving a hypergraph of hyperedges, where each of the hyperedges includes one or more vertices, and at least one of the hyperedges includes an unlabeled vertex; generating a hypergraph of vertices from the hypergraph of hyperedges, where each of the vertices in the hypergraph of vertices includes one or more of the one or more hyperedges from the hypergraph of hyperedges; performing a first type of random walk through the hypergraph of hyperedges; performing a second type of random walk through the hypergraph of vertices; generating a set of vertex embeddings from the first type of random walk and a set of hyperedge embeddings from the second type of random walk; and using results of the first and second random walks to train a neural network to create an embedding for the unlabeled vertex.

20 Claims, 7 Drawing Sheets

(56) References Cited

OTHER PUBLICATIONS

J. Lugo-Martinez and P. Radivojac, "Classification in biological networks with hypergraphlet kernels," arXiv preprint arXiv: 1703.04823, 2017.
Yu, D. Tao, and M. Wang, "Adaptive hypergraph learning and its application in image classification," IEEE Transactions on Image Processing, vol. 21, No. 7, pp. 3262-3272,2012.
Y. Gao, M. Wang, D. Tao, R. Ji, and Q. Dai, "3-cl object retrieval and recognition with hypergraph analysis," IEEE Transactions on Image Processing, vol. 21, No. 9, pp. 4290-4303,2012.
M. Liu, J. Zhang, P.-T. Yap, and D. Shen, "View-aligned hypergraph learning for alzheimer's disease diagnosis with incomplete multi-modality data," Medical image analysis, vol. 36, pp. 123-134,2017.
D. Yang, B. Qu, J. Yang, and P. Cudre-Mauroux, "Revisiting user mobility and social relationships in lsbns: a hypergraph embedding approach," in The World Wide Web Conference. ACM, 2019, pp. 2147-2157.
Y. Feng, H. You, Z. Zhang, R. Ji, and Y. Gao, "Hypergraph neural networks," in Proceedings of the AAAI Conference on Artificial Intelligence, vol. 33,2019, pp. 3558-3565.
Z. Tian, T. Hwang, and g. Kuang, "A hypergraph-based learning algorithm for classifying gene expression and arraycgh data with prior knowledge," Bioinformatics, vol. 25, No. 21, pp. 2831-2838,2009.
M. Gori, G. Monfardini, and F. Scarselli, "A new model for learning in graph domains," in Proceedings. 2005 IEEE International Joint Conference on Neural Networks, 2005., vol. 2. IEEE, 2005, pp. 729-734.
F. Scarselli, M. Gori, A. C. Tsai, M. Hagenbuchner, and G. Monfardini, "The graph neural network model," IEEE Transactions on Neural Networks, vol. 20, No. 1, pp. 61-80,2008.
M. Zaheer, S. Kottur, S. Ravanbakhsh, B. Poczos, R. R. Salakhutdinov, and A. J. Smola, "Deep sets," in Advances in neural information processing systems, 2017, pp. 3391-3401.
J. Hartford, D. R. Graham, K. Leyton-Brown, and S. Ravanbakhsh, "Deep models of interactions across sets," arXiv preprint arXiv: 1803.02879, 2018.
T. Mikolov, I. Sutskever, K. Chen, G. Corrado, and J. Dean, "Distributed representations of words and phrases and their compositionality," 2013.
B. Perozzi, R. Al-Rfou, and S. Skiena, "Deepwalk," Proceedings of the 20th ACM SIGKDD international conference on Knowledge discovery and data mining—KDD '14, 2014.
L. Tang and H. Liu, "Leveraging social media networks for classification," Data Mining and Knowledge Discovery, vol. 23, No. 3, pp. 447-478, 2011.
X. Huang, J. Li, and X. Hu, "Label informed attributed network embedding," in Proceedings of the Tenth ACM International Conference on Web Search and Data Mining, ACM, 2017, pp. 731-739.
L. Tang and H. Liu, Scalable learning of collective behavior based on sparse social dimensions, in Proceedings of the 18th ACM conference on Information and knowledge management. ACM, 2009, pp. 1107-1116.
L. Tang, "Relational learning via latent social dimensions," in Proceedings of the 15th ACM SIGKDD international conference on Knowledge discovery and data mining. ACM, 2009, pp. 817-826.
S. A. Macskassy and F. Provost, "A simple relational classifier," New York Univ NY Stern School of Business, Tech. Rep., 2003.
A. Grover and J. Leskovec, "node2vec: Scalable feature learning for networks," in Proceedings of the 22nd ACM SIGKDD international conference on Knowledge discovery and data mining. ACM, 2016, pp. 855-864.
Z. Yang, W. W. Cohen, and R. Salakhutdinov, "Revisiting semi-supervised learning with graph embeddings," 2016.
H. Gao and H. Huang, "Deep attributed network embedding." in IJCAI, vol. 18, 2018, pp. 3364-3370.

C. Yang, Z. Liu, D. Zhao, M. Sun, and E. Chang, "Network representation learning with rich text information," in Twenty-Fourth International Joint Conference on Artificial Intelligence, 2015.
W. Hamilton, Z. Ying, and J. Leskovec. "Inductive representation learning on large graphs," in Advances in Neural Information Processing Systems, 2017, pp. 1024-1034.
J. Bruna, W. Zaremba, A. Szlam, and Y. LeCun, "Spectral networks and locally connected networks on graphs," arXiv preprint arXiv: 1312.6203, 2013.
T. N. Kipf and M. Welling, "Semi-supervised classification with graph convolutional networks," arXiv preprint arXiv:1609.02907,2016.
T. N. Kipf and M. Welling, "Variational graph auto-encoders," arXiv preprint arXiv: 1611.07308, 2016.
S. Ravanbakhsh, J. Schneider, and B. Poczos, "Deep learning with sets and point clouds," arXiv preprint arXiv: 1611.04500, 2016.
C. R. Qi, H. Su, K. Mo, and L. J. Guibas,—Pointnet: Deep learning on point sets for 3d classification and segmentation, Co.RR, vol. abs/1612.00593, 2016.
C. R. Qi, L. Vi, H. Su, and L. J. Guibas, "Pointnet++: Deep hierarchical feature learning on point sets in a metric space," in Advances in neural information processing systems, 2017, pp. 5099-5108.
D. Zhou, J. Huang, and B. SchOlkopf, "Learning with hypergraphs: Clustering, classification, and embedding," in Advances in neural information processing systems, 2007, pp. 1601-1608.
J. Chitra and B. Li. Raphael, "Random walks on hypergraphs with edge-dependent vertex weights," oRR, vol. abs/1905.08287, 2019.
S. N. Satchidanand, H. Ananthapadmanaban, and B. Ravindran, "Extended discriminative random walk: a hypergraph approach to multi-view multi-relational transductive learning," in Twenty-Fourth International Joint Conference on Artificial Intelligence, 2015.
A. Sharma, S. Joty, H. Kharkwal, and J. Srivastava, "Hyperedge2vec: Distributed representations for hyperedges," 2018.
S. Bai, F. Zhang, and P. H. Torr, "Hypergraph convolution and hypergraph attention," arXiv preprint arXiv:1901.08150, 2019.
L. v. d. Maaten and G. Hinton, "Visualizing data using t-sne," Journal of machine learning research, vol. 9, No. Nov, pp. 2579-2605, 2008.
S. Cao, W. Lu, and Q. Xu, "Grarep: Learning graph representations with global structural information," in Proceedings of the 24th ACM international on conference on information and knowledge management. ACM, 2015, pp. 891-900.
J. Tang, M. Qu, M. Wang, M. Zhang, J. Yan, and Q. Mei, "LINE: Large-scale Information Network Embedding," Proceedings of the 24th International Conference on Worid Wide Web—WWW '15, 2015.
N. Srivastava, G. Hinton, A. Krizhevsky, I. Sutskever, and R. Salakhutdinov, "Dropout: a simple way to prevent neural networks from overfitting," The journal of machine learning research, vol. 15, No. 1, pp. 1929-1958, 2014.
V. Nair and G. E. Hinton, "Rectified linear units improve restricted boltzmann machines," in Proceedings of the 27th international conference on machine learning (ICML-10), 2010, pp. 807-814.
E. Ihler, D. Wagner, and F. Wagner, "Modeling hypergraphs by graphs with the same mincut properties," Information Processing Letters, vol. 45, No. 4, pp. 171-175, 1993.
M. Giurgiu, J. Reinhard, B. Brauner, I. Dunger-Kaltenbach, G. Fobo, G. Fiishman, C. Montrone, and A. Ruepp, "Corum: the comprehensive resource of mammalian protein complexes—2019," Nucleic acids research, vol. 47, No. DI, pp. D559-0563, 2018.
K. Tu, P. Cui, X. Wang, F. Wang, and W. au, "Structural deep embedding for hyper-networks," in Thirty-Second AAA Conference on Artificial Intelligence, 2018.
Payne, Josh. "Deep Hyperedges: a Framework for Transductive and Inductive Learning on Hypergraphs", IBM T.J. Watson Research Center, Oct. 7, 2019.

* cited by examiner

TRAINING A NEURAL NETWORK TO CREATE AN EMBEDDING FOR AN UNLABELED VERTEX IN A HYPERGRAPH

STATEMENT REGARDING PRIOR DISCLOSURES BY THE INVENTOR OR A JOINT INVENTOR

The following disclosure is submitted under 35 U.S.C. 102(b)(1)(A):

BACKGROUND

The present invention relates to the field of hypergraphs. Still more particularly, the present invention relates to the field of creating an embedding for an unlabeled vertex in a hypergraph.

A hypergraph is a data structure with data points ("nodes", also called vertices) and collections that contain certain data points ("hyperedges", also called hyperlinks). Within the hypergraph, nodes are part of the same collection if they are within the same hyperedge.

SUMMARY

In one or more embodiments of the present invention, a method creates an embedding for an unlabeled vertex in a hypergraph. The method includes receiving a hypergraph of hyperedges, where each of the hyperedges includes one or more vertices, and where at least one of the hyperedges includes an unlabeled vertex; generating a hypergraph of vertices from the hypergraph of hyperedges, where each of the vertices in the hypergraph of vertices includes one or more of the one or more hyperedges from the hypergraph of hyperedges; performing a first type of random walk through the hypergraph of hyperedges; performing a second type of random walk through the hypergraph of vertices; generating a set of vertex embeddings from the first type of random walk and a set of hyperedge embeddings from the second type of random walk; and utilizing a training set of vertex embeddings and a training set of hyperedge embeddings that are similar to the set of vertex embeddings from the first type of random walk and the set of hyperedge embeddings from the second type of random walk to train a neural network to create an embedding for the unlabeled vertex.

In an embodiment of the present invention, the first type of random walk is a Subsample and Traverse (SaT) random walk, and the second type of random walk is a Traverse and Select (TaS) random walk.

In an embodiment of the present invention, the method further includes: generating vector representations of known vertices in the hypergraph; generating a vector representation of the unlabeled vertex; matching the vector representation of the unlabeled vertex to a matching vector representation from the vector representations of the known vertices in the hypergraph; extracting one or more matching feature vectors from the matching vector representation; and adding the one or more matching feature vectors to the embedding for the unlabeled vertex.

In one or more embodiments, the method(s) described herein are performed by an execution of a computer program product and/or a computer system.

That is, in an embodiment of the present invention, a computer program product includes a computer readable storage medium having program code embodied therewith. The computer readable storage medium is not a transitory signal per se, and the program code is readable and executable by a processor to perform a method that includes, but is not limited to: receiving a hypergraph of hyperedges, where each of the hyperedges includes one or more vertices, and where at least one of the hyperedges includes an unlabeled vertex; generating a hypergraph of vertices from the hypergraph of hyperedges, where each of the vertices in the hypergraph of vertices includes one or more of the one or more hyperedges from the hypergraph of hyperedges; performing a first type of random walk through the hypergraph of hyperedges; performing a second type of random walk through the hypergraph of vertices; generating a set of vertex embeddings from the first type of random walk and a set of hyperedge embeddings from the second type of random walk; and utilizing a training set of vertex embeddings and a training set of hyperedge embeddings that are respectively similar to the set of vertex embeddings from the first type of random walk and the set of hyperedge embeddings from the second type of random walk to train a neural network to create an embedding for the unlabeled vertex.

Furthermore, an embodiment of the present invention is a computer system that includes one or more processors, one or more computer readable memories, and one or more computer readable non-transitory storage mediums. Program instructions are stored on at least one of the one or more computer readable non-transitory storage mediums for execution by at least one of the one or more processors via at least one of the one or more computer readable memories. When executed, the stored program instructions perform a method that includes, but is not limited to: receiving a hypergraph of hyperedges, where each of the hyperedges includes one or more vertices, and where at least one of the hyperedges includes an unlabeled vertex; generating a hypergraph of vertices from the hypergraph of hyperedges, where each of the vertices in the hypergraph of vertices includes one or more of the one or more hyperedges from the hypergraph of hyperedges; performing a first type of random walk through the hypergraph of hyperedges; performing a second type of random walk through the hypergraph of vertices; generating a set of vertex embeddings from the first type of random walk and a set of hyperedge embeddings from the second type of random walk; and utilizing a training set of vertex embeddings and a training set of hyperedge embeddings that are respectively similar to the set of vertex embeddings from the first type of random walk and the set of hyperedge embeddings from the second type of random walk to train a neural network to create an embedding for the unlabeled vertex.

DETAILED DESCRIPTION

Figure 1:
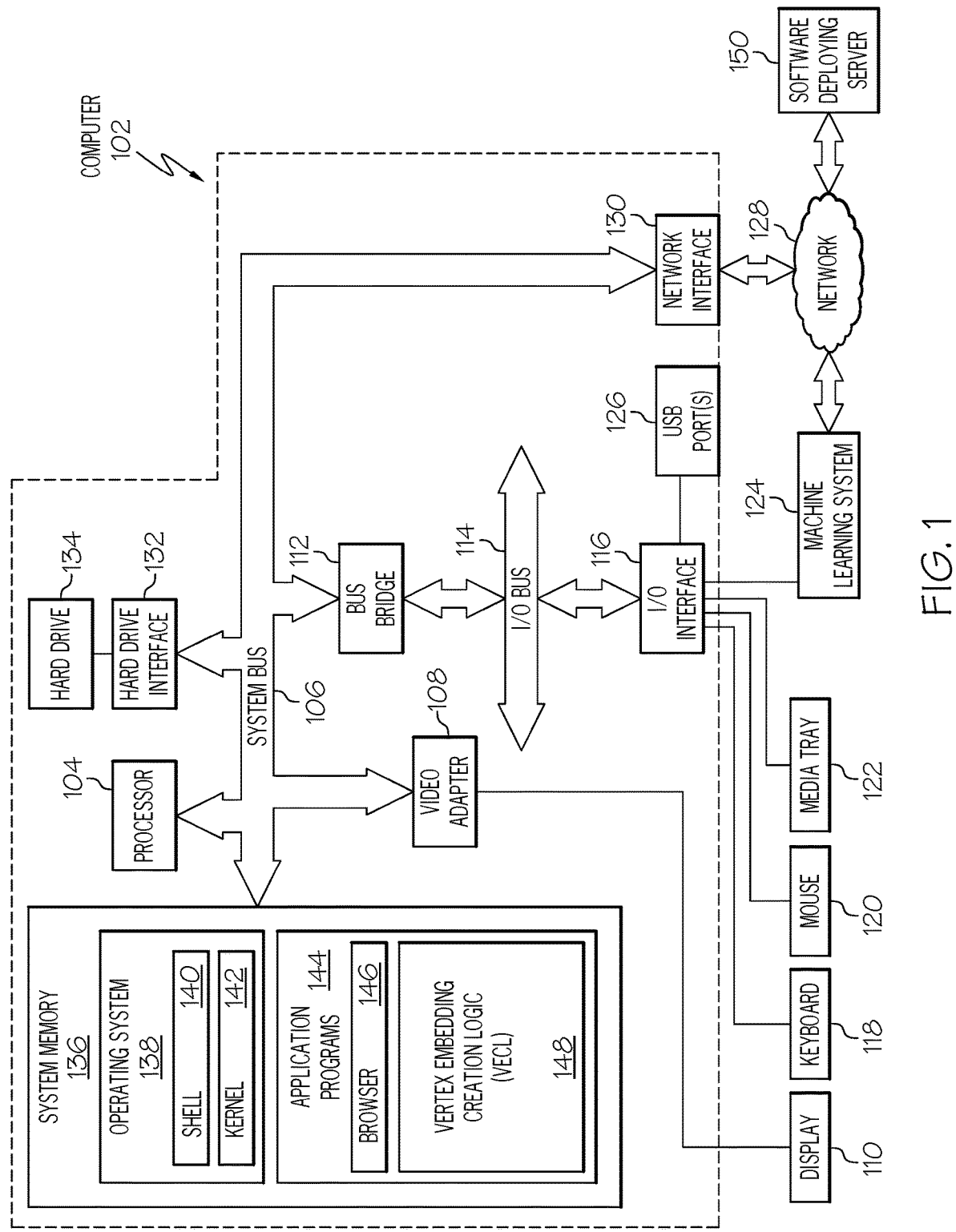
FIG. 1 depicts an exemplary system and network in which the present invention is implemented in one or more embodiments of the present invention.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that is utilized by and/or implemented in one or more embodiments of the present invention. Note that some or all of the exemplary architecture, including both depicted hardware and software, shown for and within computer 102 may be utilized by machine learning system 124 and/or software deploying server 150 shown in FIG. 1, as well as the deep neural network (DNN) 424 shown in FIG. 4.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a machine learning system 124, and external USB port(s) 126. While the format of the ports connected to I/O interface 116 may be any known to those skilled in the art of computer architecture, in one or more embodiments some or all of these ports are universal serial bus (USB) ports.

As depicted, computer 102 is able to communicate with a software deploying server 150 and/or the machine learning system 124 using a network interface 130 to a network 128. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one or more embodiments, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Vertex Embedding Creation Logic (VECL) 148. VECL 148 includes code for implementing the processes described below, including those described in FIGS. 2-5. In one or more embodiments, computer 102 is able to download VECL 148 from software deploying server 150, including in an on-demand basis, wherein the code in VECL 148 is not downloaded until needed for execution. Note further that, in one or more embodiments of the present invention, software deploying server 150 performs all of the functions associated with the present invention (including execution of VECL 148), thus freeing computer 102 from having to use its own internal computing resources to execute VECL 148.

Also connected to (or alternatively, as part of) computer 102 is a machine learning system 124. In exemplary embodiments of the present invention, machine learning system 124 is a Deep Neural Network (see FIG. 4) or another type of heuristic artificial intelligence.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention. For example, and with specific regard to a server as used in one or more embodiments of the present invention, computer 102 is lacking elements such as irrelevant components such as video adapter 108, keyboard 118, etc., but includes elements (not shown) such as graphics processing units, co-processors for various functions (e.g., dedicated to certain arithmetic processes), etc.

From social networks to protein complexes to disease genomes to visual data, hypergraphs are ubiquitous. However, the scope of research studying deep learning on hypergraphs is still quite sparse and nascent, as there has not yet existed an effective, unified framework for using hyperedge and vertex embeddings jointly in the hypergraph context. As such, one or more embodiments of the present invention utilize a new and useful type of hyperedge, referred to herein as Deep Hyperedges (DHE), which provide a modular framework that jointly uses contextual and permutation-invariant vertex membership properties of hyperedges in hypergraphs to perform classification and regression in transductive and inductive learning settings.

In one or more embodiments, the present invention uses a novel random walk procedure that surpasses state-of-the-art performance on benchmark datasets. Additionally, in one or more embodiments of the present invention, such novel random walk procedures are applied on a variety of diverse, non-standard hypergraph datasets.

Thus, one or more embodiments of the present invention present a novel framework that utilizes context-based graph embedding approaches and permutation-invariant learning to perform transductive and inductive inference on hypergraphs—sets of sets with underlying contextual graph structure. This framework is useful in the classification and regression of vertices and hyperedges alike.

As used in one or more embodiments of the present invention, a hypergraph H=(V, E) is comprised of a finite set of vertices V={$v_1, v_2, \ldots, v_n$} and a set of hyperedges E={$e_1, e_2, \ldots, e_m$}$\subseteq 2^V$. In one or more embodiments, the present invention utilizes connected hypergraphs with |V|≥2.

Figure 2:
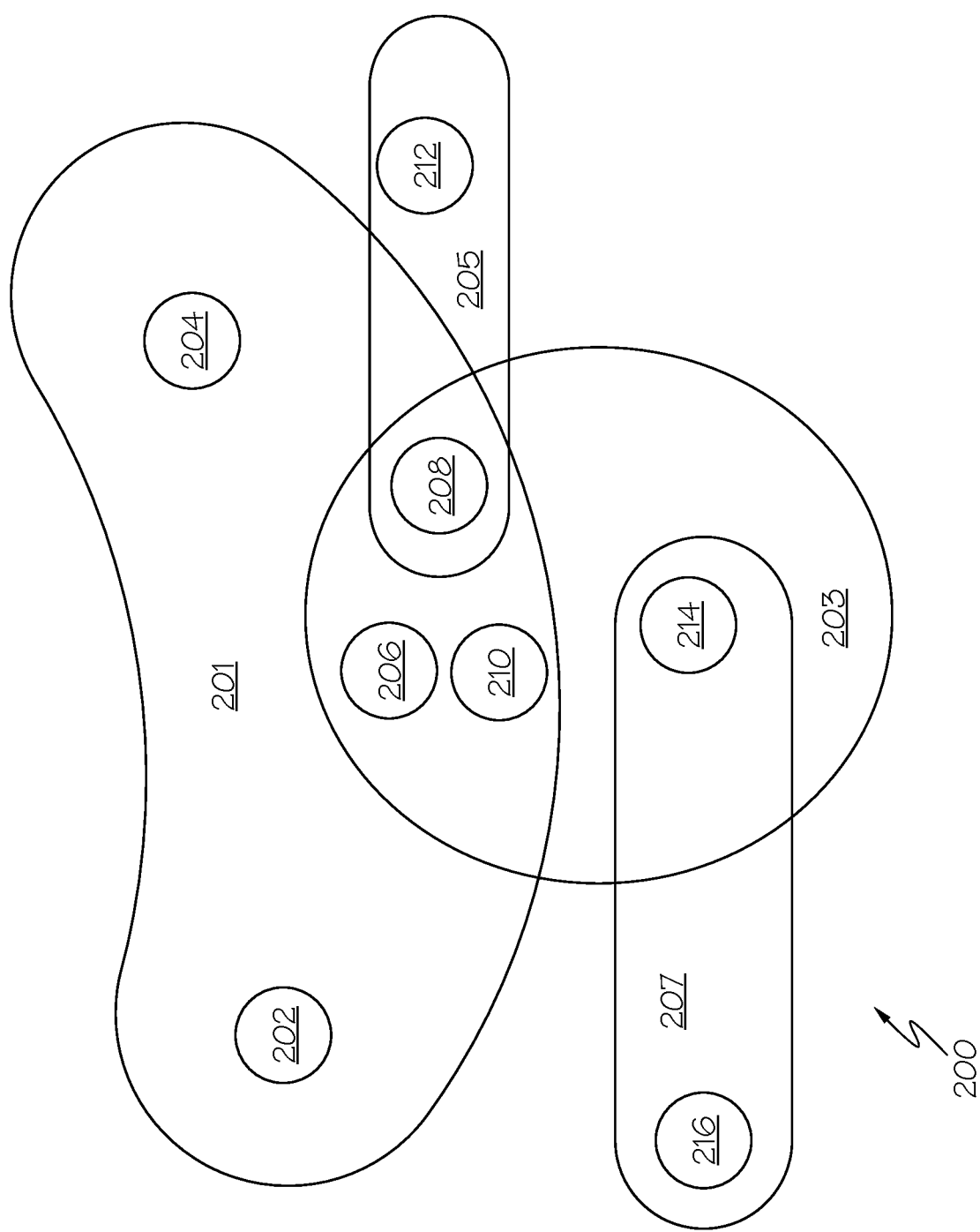
FIG. 2 illustrates an exemplary hypergraph as used in one or more embodiments of the present invention.

With reference now to FIG. 2, an exemplary hypergraph 200 as utilized in one or more embodiments of the present invention is depicted.

As illustrated in FIG. 2, exemplary hypergraph 200 is a graph of vertices/nodes, each or which represent an entity and/or traits of an entity. For example, vertex 202 could represent a person who has a same occupation as persons represented by vertex 204, vertex 206, and vertex 208, all of which are displayed within a same hyperedge 201, and all of which include an embedding. An "embedding" is defined herein as a vector, string, or other information representation that describes an entity represented by a vertex (i.e., node) in a hypergraph. An example of an embedding for a vertex for a person represented in a hypergraph is a label that describes that person.

Other hyperedges, each containing multiple vertices, overlap with hyperedge 201, thus indicating some type of feature shared by entities represented by these multiple vertices. For example, hyperedge 203 includes vertices 206, 208, 210, 214, which represent persons/entities that share some other common feature/trait. Hyperedge 205 includes vertices 208 and 212, which represent persons/entities that share some yet another common feature/trait. Hyperedge 207 includes vertices 214 and 216, which represent persons/entities that share yet some other common feature/trait. However, vertices 206, 208, and 210 represent persons/entities that share a feature/trait common to vertices found in hyperedges 201, 203, and 205.

As shown in hypergraph 200, hyperedge 201 also includes an unlabeled vertex 210. However, unlabeled vertex 210 does not include an embedding that describes an occupation, and thus is referenced herein as being an "unlabeled vertex". That is, unlabeled vertex 210 is included in hyperedge 201 since it shares other traits with persons represented by vertices 202, 204, 206, 208 (such as city of residence). However, initially it is unknown whether or not the person represented by unlabeled vertex 210 has a same occupation as that held by persons represented by vertices 202, 204, 206, 208. As such, one or more embodiments of the present invention quickly and efficiently determine whether the person/entity represented by unlabeled vertex 210 shares a particular trait/feature as persons/entities represented by vertices 202, 204, 206, 208.

Figure 3:
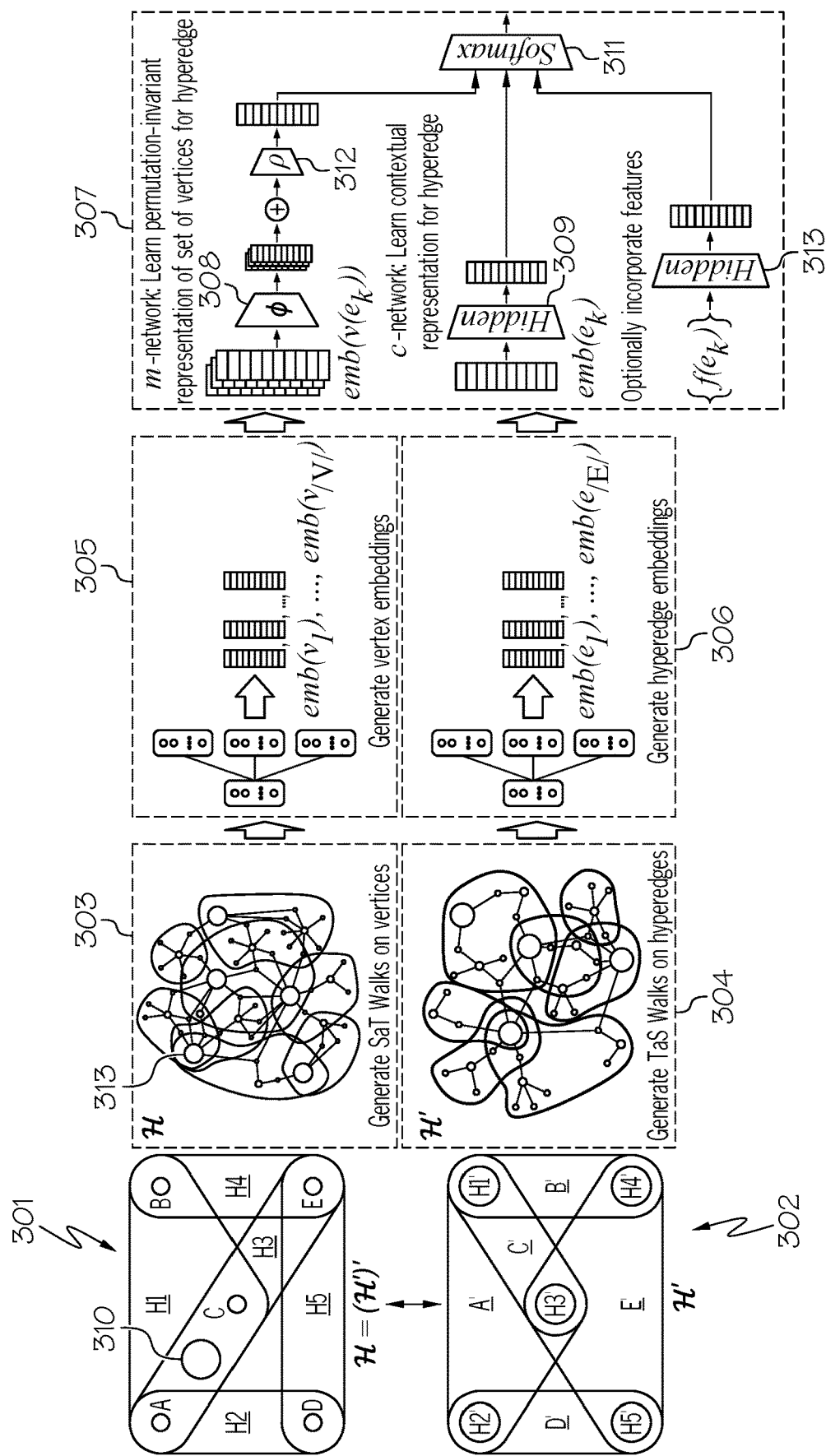
FIG. 3 depicts a high-level overview of one or more embodiments of the present invention.

Before discussing FIG. 3, a background on a dual of a hypergraph is now presented.

A dual, H', of a hypergraph H is a hypergraph such that the hyperedges and vertices of H' are given by the vertices and hyperedges of H, respectively. That is, a vertex $v'_i$ of H' is a member of a hyperedge $e'_j$ of H' if and only if its corresponding hyperedge $e_i$ of H contained the vertex $v_j$ of H corresponding to $e'_j$. Note that (H)'=H.

A graph $\mathcal{G}$ is a hypergraph where |$e_i$|=2 for each $e_i \in E$.

Traditional graphs are not capable of completely representing the information captured in hypergraphs. For example, if |V|≥4, there does not exist a representation of a hypergraph by a graph with the same cut properties in the general case. This fact has practical implications as well: for instance, one cannot represent the protein complexes in a CORUM dataset for protein complexes using pairwise relationships, as the proteins in a complex may not interact with each other independently. These hyperedges are therefore indecomposable. Hence, while the theory built for studying graphs can be utilized to some capacity in the hypergraph context, there is a need for learning procedures that can effectively generalize hypergraphs. Transductive inference learning and inductive inference learning are used to meet this need in one or more embodiments of the present invention.

In transductive (or semi-supervised) inference tasks, one often seeks to learn from a small amount of labeled training data, where the model has access to labeled and unlabeled data at training time. Formally, transductive inference tasks use training instances $(xi)_1^l$, where $(xi)_1^l$ are labeled instances and $(xi)_{l+1}^{l+u}$ are unlabeled instances, with corresponding labels $y_i$ in $(ui)_1^n$.

A goal of one or more embodiments of the present invention is to learn a function F: $(xi)_1^n \rightarrow (yi)_1^n$; $x_i \mapsto y_i$. In the case of transductive learning on graphs and hypergraphs, one or more embodiments of the present invention seek to leverage topological information to represent the vertices in some continuous vector space $\mathbb{R}^d$ by embeddings which capture the vertices' or hyperedges' context (homophily and structural equivalence). As such, in the pre-training procedure for finding vertex embeddings, the present invention finds an embedding function $\Phi: V \rightarrow \mathbb{R}^d$ that maximizes the likelihood of observing a vertex in the sampled neighborhood N(v) of v given $\Phi(v)$:

$$\max \Phi \sum_{v \in V} \log P(N(v) | \Phi(v))$$

The procedure for finding contextual embeddings for hyperedges is similar. Once the present system learns $\Phi$, it uses the embeddings $\Phi(v)$ to learn F in a transductive learning procedure.

In inductive (or supervised) inference tasks, assume that the system is given a training sample $(xi)_1^n \subseteq X$ to be seen by a hypergraph model, and wants to learn a function g: X→Y; $xi \mapsto y_i$ that can generalize to unseen instances. This type of learning is particularly useful for dynamic hypergraphs, where unseen vertices arise as time passes, or when there is a need to apply transfer learning to new hypergraphs altogether. Here, the representation learning function $\Phi$ is typically dependent on the input features f(v) for a vertex v.

With reference now to FIG. 3, an overview of one or more embodiments of the present invention is presented, which utilizes novel Deep Hyperedges (DHE), a framework that utilizes context and set membership to perform transductive and inductive learning on hypergraphs.

One or more embodiments of the present invention are described for classification of hyperedges from a hypergraph H, shown as hypergraph 301 in FIG. 3. As in the hypergraph 200 shown in FIG. 2, hypergraph 301 includes an unlabeled vertex 310. The hyperedges of the dual H' (shown as hypergraph 302 in FIG. 3) of a hypergraph H correspond to the edges of H, so vertex classification is approached similarly.

Thus, hypergraph 301 (H) is made up of hyperedges H1-H5, which contain vertices A-E. Dual hypergraph 302 (H'), which is derived from hypergraph 301 (H), is made up of representations of vertices A'-E', which "capture" the hyperedges H1'-H5'.

DHE, as described below, is conducive to random walk, spectral, and convolutional approaches for the vertex and hyperedge embedding steps. Furthermore, and in one or more embodiments of the present invention, DHE utilizes a random walk approach for the sake of parallelizability and scalability, and inductive inference.

Deep Hyperedges (DHE) is composed of four main learning stages: vertex and hyperedge random walk generation, embedding of vertices and hyperedges, contextual and permutation-invariant representation learning, and cumulative inference. Conceptually, these stages can be considered as "Random Walks and Embeddings" and "Contextual and Permutation-Invariant Representation Learning".

Random Walks and Embeddings

One or more embodiments of the present invention utilize a novel random walk model for hypergraphs that seeks to represent each vertex in a way that places more weight on capturing co-member information in its hyperedge. Currently proposed random walk models on hypergraphs traverse to new hyperedges with each vertex selection, as is done in most graph random walk models, meaning that the random walk will jump around very rapidly. To combat this, one or more embodiments of the present invention utilize Subsample and Traverse (SaT) walks, as shown in block 303. In a SaT walk, the process starts at a vertex $v_m$ in a selected hyperedge $e_i$. The probability of traversing is inversely proportional to the cardinality of the current hyperedge. That is $$p = \min\left(\frac{a}{|ei|} + \beta, 1\right),$$

where $\alpha$, $\beta \geq 0$ are tunable parameters. The expectation of samples the walk will draw from a given hyperedge is geometric, and thus influenced by the cardinality of the hyperedge itself. Using SaT walks, the system constructs random walks of vertices in the hypergraph for embedding in the next stage.

Thus, in a SaT walk, the system creates multiple subsamples of vertices from the hypergraph, and then walks (i.e., passes through the vertices) through each subsample.

Likewise, one or more embodiments of the present invention performs SaT walks on H' to embed the hyperedges of H. These walks are described herein as Traverse and Select (TaS) walks, as shown in block 304. Using TaS walks, the system constructs random walks of hyperedges in the hypergraph for contextual embedding in the next stage.

Thus, in a TaS walk, the system performs a random walk through hyperedges, rather than vertices, and selects a particular hyperedge walk to identify embeddings that describe the hyperedges.

In one or more embodiments of the preset invention, the system defines in-out and return parameters for TaS walks (e.g., using a system that creates a vector to describe a node/vertex such as node2vec) for controlling the degree of homophily versus structural equivalence representation (by inclining the search strategy toward Breadth First Search—BFS or Depth First Search—DFS) when embedding the hyperedges in skip-gram.

Thus, a skip-gram technique creates context-based embeddings $\Phi(v)$, $\Phi(e)$ of the vertices and hyperedges after the random walks have been generated.

That is, as shown in block 305, vertex embeddings (e.g., vector descriptions of the vertices) are generated using trained weights/biases against the results of the SaT walk shown in block 303 to create the vertex embeddings.

As shown in block 306, hyperedge embeddings (e.g., vector descriptions of the hyperedges) are generated using trained weights/biases against the results of the TaS walk shown in block 304 to create the hyperedge embeddings.

Contextual and Permutation-Invariant Representation Learning

At this stage, the present invention employs two distinct networks, which address the following two objectives: 1) learning a representation of each hyperedge that captures its contextual information, and 2) creating a representation of each hyperedge that captures the membership of its vertices in a manner that is invariant to permutation, as shown in block 307.

To address the first objective, the present invention constructs a context network (c-network) that applies j hidden layers h to the hyperedge embedding $\Phi(e)$ to output a learned contextual representation $h^j(\Phi(e_i))=c(e_i)$. The second objective requires a linear transformation at a hidden layer for permutation invariance. The present invention uses the $\phi$ and $\rho$ networks of the DeepSets architecture.

The membership representation network (m-network) takes as input $\Phi(v)$ for each $v \in e_i$, applies a nonlinear transformation to these inputs individually (forming $\phi$ network that is created by a deep neural network (DNN) 308), adds up the representations to obtain $\Sigma_{v \in ei} \phi(\Phi(v))$, and finally apply k hidden layers to this representation (forming the p network that is created by DNN 312) to obtain a membership representation $m(e_i)$ of the hyperedge $e_i$ that is invariant to permutation. The method then concatenates the representations output by the c-network and m-network and applies/hidden layers (e.g., from DNN 309 and a final softmax layer: softmax($h^l(c(e_i)\|m(e_i))$).

In an alternative embodiment, the system applies m hidden layers (e.g., from DNN 313) to the input feature vector $f(e_i)$ to obtain $h^m(f(e_i))$, such that the formulation is then:

softmax($h^l(c(e_i)\|m(e_i)\|h^m(f(e_i))$)

This is the formulation used with DNN 311 shown in FIG. 3. For the inductive formulation, the system needs to learn a function that can generalize to unseen vertices. Hence, this function will only depend initially on an input feature vector $f(e_i)$ and a uniform sampling and pooling aggregation procedure that arises naturally with SaT walks and TaS walks.

Thus, FIG. 3 demonstrates details of the process for generating vertex embeddings (block 305) from a SaT walk through vertices in hypergraph 301, and then running these vertex embeddings through DNN 308 and DNN 312 to create a vertex embedding input for the softmax process running on DNN 311. Furthermore, the process generates hyperedge embeddings (block 306) from a TaS walk through hyperedges in hypergraph 302, and then runs these hyperedge embeddings through DNN 309 to create a hyperedge embedding input for the softmax process running on DNN 311. Optionally, other embeddings (which in one or more embodiments of the present invention are not be derived from a hypergraph random walk, but rather are features extracted directly from a hypergraph) can be run through DNN 313 to create a third input to the softmax running on DNN 311.

The DNN 311 then outputs an embedding (e.g., a descriptive vector) for the unlabeled vertex 310.

As just described, one or more embodiments of the present invention uses deep neural networks, such as DNN 308, DNN 309, DNN 311, DNN 312, and DNN 313 shown in FIG. 3.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are only "excitatory" to varying degrees.

In a Deep Neural Network (DNN), electronic neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often a single node for holding vector information.

Figure 4:
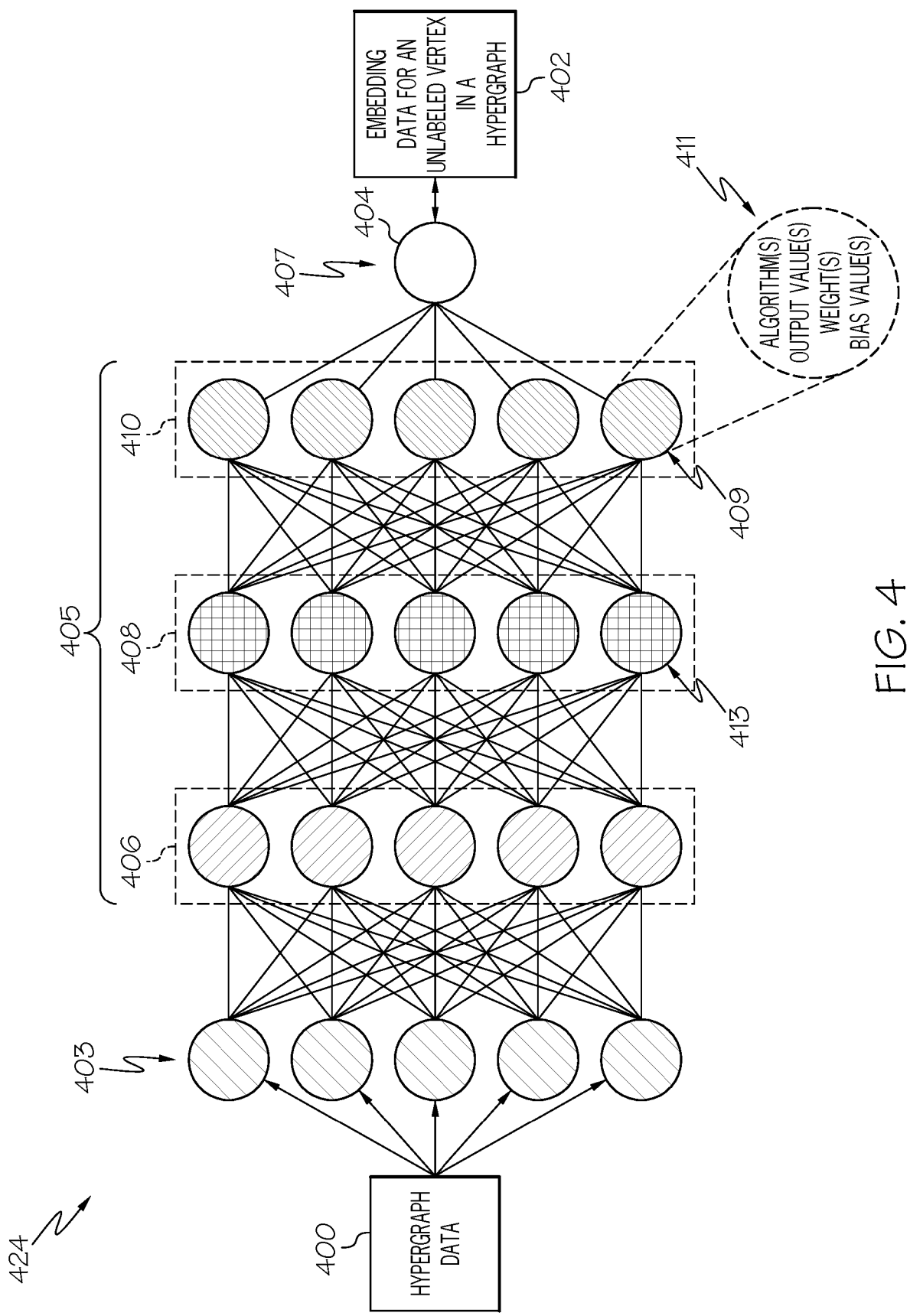
FIG. 4 illustrates an exemplary Deep Neural Network (DNN) as used in one or more embodiments of the present invention.

With reference now to FIG. 4, a Deep Neural Network (DNN) 424 (analogous to machine learning system 124 shown in FIG. 1, and/or DNN 308, DNN 309, DNN 311, DNN 312, and/or DNN 313 shown in FIG. 3) used to process hypergraph data 400 from a hypergraph as described herein is presented. That is, when hypergraph data 400 is from the hypergraph described above, when input into a trained version of DNN 424, an embedding (i.e., embedding data that describes the unlabeled vertex from the hypergraph) is output from the DNN 424 (e.g., DNN 311 shown in FIG. 3).

The electronic neurons (also referred to herein simply as "neurons" or "nodes") in DNN 424 are arranged in layers, known as an input layer 403, hidden layers 405, and an output layer 407. The input layer 403 includes neurons/nodes that take input data, and send it to a series of hidden layers of neurons (e.g., hidden layers 405), in which neurons from one layer in the hidden layers are interconnected with all neurons in a next layer in the hidden layers 405. The final layer in the hidden layers 405 then outputs a computational result to the output layer 407, which is often a single node for holding vector information. In one or more embodiments of the present invention, each neuron in the output layer 407 is associated with a particular embedding data 402, as shown in FIG. 4.

As just mentioned, each node in the depicted DNN 424 represents an electronic neuron, such as the depicted neuron 409. As shown in block 411, each neuron (including neuron 409) functionally includes at least three features: a mathematical function, an output value, a weight, and a bias value.

The mathematical function is a mathematic formula for processing data from one or more upstream neurons. For example, assume that one or more of the neurons depicted in the middle hidden layers 405 send data values to neuron 409. Neuron 409 then processes these data values by executing the mathematical function shown in block 411, in order to create one or more output values, which are then sent to another neuron, such as another neuron within the hidden layers 405 or a neuron in the output layer 407. Each neuron also has a weight that is specific for that neuron and/or for other connected neurons. Furthermore, the output value(s) are added to bias value(s), which increase or decrease the output value, allowing the DNN 424 to be further "fine-tuned".

For example, assume that neuron 413 is sending the results of its analysis of a piece of data to neuron 409. Neuron 409 has a first weight that defines how important data coming specifically from neuron 413 is. If the data is important, then data coming from neuron 413 is weighted heavily, and/or increased by the bias value, thus causing the mathematical function (s) within neuron 409 to generate a higher output, which will have a heavier impact on neurons in the output layer 407. Similarly, if neuron 413 has been determined to be significant to the operations of neuron 409, then the weight in neuron 413 will be increased, such that neuron 409 receives a higher value for the output of the mathematical function in the neuron 413. Alternatively, the output of neuron 409 can be minimized by decreasing the weight and/or bias used to affect the output of neuron 409. These weights/biases are adjustable for one, some, or all of the neurons in the DNN 424, such that a reliable output will result from output layer 407. In one or more embodiments of the present invention, finding the values of weights and bias values is done automatically by training the neural network. In one or more embodiments of the present invention, manual adjustments are applied to tune the hyperparameters such as learning rate, dropout, regularization factor and so on. As such, training a neural network involves running forward propagation and backward propagation on multiple data sets until the optimal weights and bias values are achieved to minimize a loss function. The loss function measures the difference in the predicted values by the neural network and the actual labels for the different inputs.

When manually adjusted, the weights are adjusted by the user, sensor logic, etc. in a repeated manner until the output from output layer 407 matches expectations. For example, assume that input layer 403 receives inputs that describe a embeddings from a certain hypergraph. In an exemplary input, the input to input layer 403 also contains values that describe an unlabeled vertex in a hypergraph. If DNN 424 has been properly trained (by adjusting the mathematical function (s), output value(s), weight(s), and biases in one or more of the electronic neurons within DNN 424) to output a vector/value to the output layer 407, indicating that the neuron 404 that is associated with the embedding data 402, which describes embedding data for an unlabeled vertex in a hypergraph, assuming that the input layer 403 and the hidden layers 405 have been properly trained to evaluate unlabeled vertices in a hypergraph.

When automatically adjusted, the weights (and/or mathematical function) are adjusted using "back propagation", in which weight values of the neurons are adjusted by using a "gradient descent" method that determines which direction each weight value should be adjusted to. This gradient descent process moves the weight in each neuron in a certain direction until the output from output layer 407 improves (e.g., accurately describes the embedding data for an unlabeled vertex in a hypergraph, such as unlabeled vertex 210 shown in FIG. 2).

In one or more embodiments of the present invention, the DNN 424 is trained to create an embedding for an unlabeled vertex by using hypergraph data 400 that is actually vertex embeddings and hyperedge embeddings from a training hypergraph that is similar to the hypergraph that is to be evaluated in order to create an embedding for an unlabeled vertex within that hypergraph (i.e., has similar types of vertices, a similar number of vertices, a similar placement of vertices within certain hyperedges, a similar positioning of vertices within one or more of the hyperedges, etc.). Thus, by using the back-propagation and/or manual adjustment described above for training DNN 424, the output layer 407 will produce an embedding that is confirmed (e.g., by a trainer) to be appropriate for the unlabeled vertex in the training hypergraph. This trained version of DNN 424 is now ready to create an embedding for an unlabeled vertex from a hypergraph that is similar to the training hypergraph.

As shown in FIG. 4, various layers of neurons are shaded differently, indicating that they are specifically trained for different aspects of a candidate identity network. For example, and as shown in FIG. 4, the input layer 403 is specific for all information about an identity network.

Within the hidden layers 405 are layer 406, which contains neurons that are designed to evaluate a first set of features (e.g., occupation of an entity represented by a vertex) that are shared by vertices in a particular hyperedge; layer 408, which contains neurons that are designed to evaluate a second set of features (e.g., a state of residence of an entity represented by a vertex) shared by vertices in a particular hyperedge; and layer 410, which contains neurons that are designed to evaluate a third set of features (e.g., an employer of an entity represented by a vertex) shared by vertices in a particular hyperedge.

Thus, in the embodiment of DNN 424 shown in FIG. 4, layer 406 controls the inputs to the neurons in layer 408. The outputs of neurons from layer 408 then control the inputs to the neurons in layer 410.

While FIG. 4 depicts an embodiment of the present invention in which a DNN is used to establish an embedding for an unlabeled vertex in a hypergraph. Alternatively, unsupervised reinforced learning, such as Q-learning, can be utilized in one or more embodiments of the present invention.

Unsupervised reinforced learning is an artificial intelligence that uses train and error to eventually find an optimal approach to a task. For example, if the task is to hit a ball with a bat, a robot will randomly swing a bat at the pitched ball. If the bat swings above or below the pitched ball, or if the bat swings before or after the pitched ball passes by the bat, then a negative value (i.e., a negative reward) is given to the actions of the bat, thus encouraging the robot not to take such a swing. However, if the bat "tips" the pitched ball, then a positive reward/value is given to the robot for this swing, thus encouraging the robot to take such a swing. If the bat connects solidly with the pitched ball, then an even higher reward/value is given to the robot for taking this swing, thus encouraging the robot even further to take such a swing.

A Q-learning reinforced learning system uses a Q-learning algorithm, which updates Q values of rewards when the actor/robot performs a certain action (swinging a bat) in a certain state (when the pitched ball is approaching the robot).

Using these same approaches with the present invention, an unsupervised reinforced learning and/or a Q-learning reinforced learning system learns which embedding data is accurate (as determined by a trainer) and which is not, thus allowing the system to auto-correct predicted embeddings for an unlabeled vertex in a hypergraph.

Figure 5:
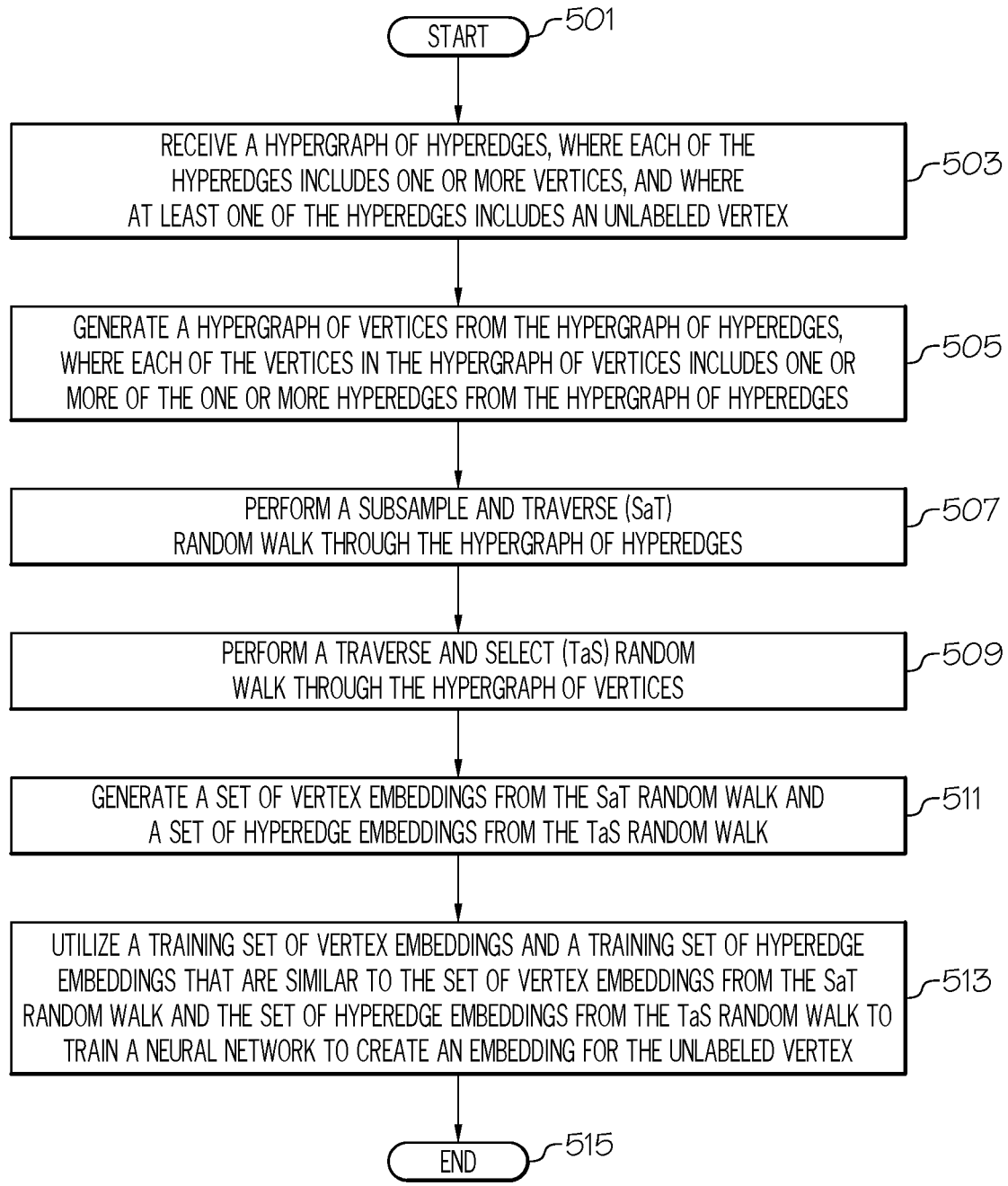
FIG. 5 is a high-level flow chart of one or more steps performed in accordance with one or more embodiments of the present invention.

With reference now to FIG. 5, a high-level flow chart of one or more procedures performed in one or more embodiments of the present invention is presented.

After initiator block 501, one or more processors receive a hypergraph of hyperedges, as shown in block 503. As described in block 301 in FIG. 3, the hypergraph of hyperedges includes one or more vertices, and at least one of the hyperedges includes an unlabeled vertex (e.g., unlabeled vertex 210 shown in FIG. 2). As shown in block 301 in FIG. 3, one or more embodiments of the hypergraph includes one or more nodes that indicate when a particular vertex "jumps" from one hyperedge to another hyperedge.

That is, the unlabeled vertex 210 shown in FIG. 2 is part of three hyperedges: hyperedge 201, hyperedge 203, and hyperedge 205. Since each hyperedge will impart a certain label (description, embedding) onto the vertices with that hyperedge, the system initially cannot tell which label is appropriate for unlabeled vertex 210. The present invention solves this problem by providing a prediction for an embedding that describes the entity that is represented by the unlabeled vertex 210.

As shown in block 505, the processor(s) generate a hypergraph of vertices from the hypergraph of hyperedges. As described in block 302 in FIG. 3, the hypergraph of vertices includes the one or more hyperedges from the hypergraph of vertices. That is, the system transforms a "hypergraph of hyperedges" into a "hypergraph of vertices". Thus, the hypergraph H shows which vertices are within a particular hyperedge. Hypergraph H' shows which hyperedges touch a same vertex.

As shown in block 507, the processor(s) perform a first type of random walk (e.g., a Subsample and Traverse (SaT) random walk—described above) through the hypergraph of hyperedges.

As shown in block 509, the processor(s) perform a second type of random walk (e.g., a Traverse and Select (TaS) random walk, also described above) through the hypergraph of vertices.

As shown in block 511, the processor(s) generate a set of vertex embeddings (e.g., labels, descriptors, etc. for an entity that is represented by the unlabeled vertex) from the SaT random walk and a set of hyperedge embeddings from the TaS random walk.

As shown in block 513, a neural network (e.g., DNN 311 shown in FIG. 3) is trained to create an embedding for the unlabeled vertex from a training set of vertex embeddings and a training set of hyperedge embeddings that are similar to the set of vertex embeddings from the SaT random walk and the set of hyperedge embeddings from the TaS random walk. That is, training data descriptive of known vertex embeddings and hyperedge embeddings train the neural network to create an embedding for an unlabeled vertex when similar vertex embeddings and hyperedge embeddings are used as input to the neural network. Thus, the present invention enables the neural network to assign/create an embedding for an unlabeled vertex such as the unlabeled vertex 210 shown in FIG. 2. In one or more embodiments of the present invention, the trained neural network then creates the embedding for the unlabeled vertex using the set of vertex embeddings and the set of hyperedge embeddings described with reference to FIG. 3.

The flow-chart ends at terminator block 515.

In one or more embodiments of the present invention, neural network is a deep neural network, and the embedding for the unlabeled vertex is an output of the deep neural network, as shown in FIG. 4.

In one or more embodiments of the present invention, the unlabeled vertex represents a member of a group, and such that the embedding describes the group. For example, if the unlabeled vertex is for a particular member of a certain company, then the embedding (e.g., descriptive vectors) describes that particular member as working for that company.

In one or more embodiments of the present invention, the method further comprises: generating vector representations of known vertices in the hypergraph; generating a vector representation of the unlabeled vertex; matching the vector representation of the unlabeled vertex to a matching vector representation from the vector representations of the known vertices in the hypergraph; extracting one or more matching feature vectors from the matching vector representation; and adding the one or more matching feature vectors to the embedding for the unlabeled vertex. For example, assume that the unlabeled vertex has a vector that describes a certain trait, such as a state in which the person represented by that unlabeled vertex resides. Assume further that each of the other vertices include a vector indicating that the persons represented by these other vertices also live in that state. As such, the system will then ascribe other features found in all of the other vertices (e.g., working for a certain company) to the person who is represented by the unlabeled vertex.

In one or more embodiments of the present invention, the SaT random walk (shown in block 303 in FIG. 3) passes through every vertex in the hypergraph of vertices.

In one or more embodiments of the present invention, the TaS random walk (shown in block 304 in FIG. 3) passes through every hyperedge in the hypergraph of hyperedges.

These complete walks ensure that all vertices are explored by the walks.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
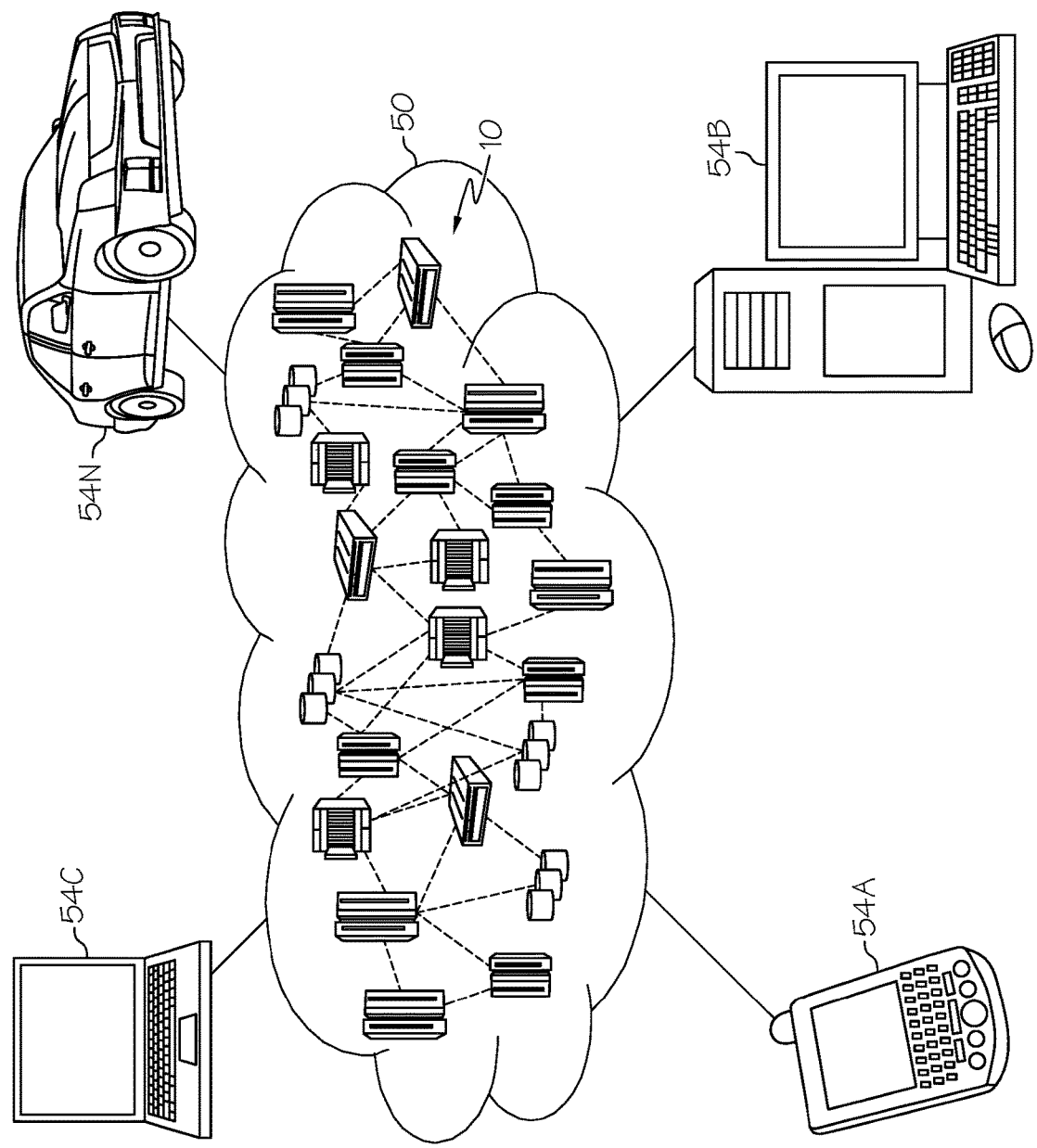
FIG. 6 depicts a cloud computing environment according to one or more embodiments of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one or more embodiments, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
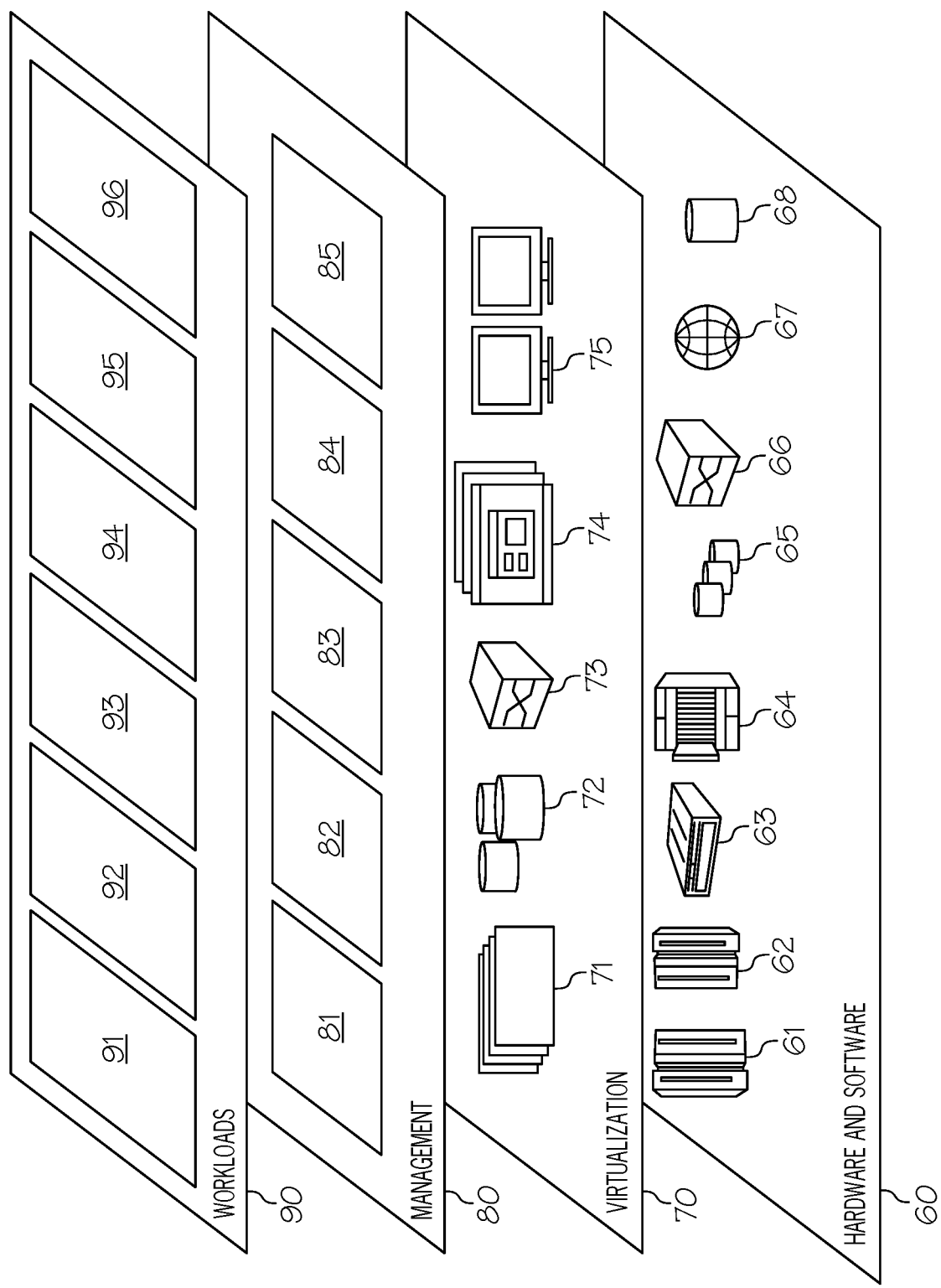
FIG. 7 depicts abstraction model layers of a cloud computer environment according to one or more embodiments of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and hypergraph vertex labeling processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:
1. A computer-implemented method comprising:
    receiving a hypergraph of hyperedges, wherein each of the hyperedges comprises one or more vertices, and wherein at least one of the hyperedges comprises an unlabeled vertex;

generating a hypergraph of vertices from the hypergraph of hyperedges, wherein each of the vertices in the hypergraph of vertices comprises one or more of the one or more hyperedges from the hypergraph of hyperedges;

performing a first type of random walk through the hypergraph of hyperedges;

performing a second type of random walk through the hypergraph of vertices;

generating a set of vertex embeddings from the first type of random walk and a set of hyperedge embeddings from the second type of random walk; and utilizing a training set of vertex embeddings and a training set of hyperedge embeddings that are respectively similar to the set of vertex embeddings from the first type of random walk and the set of hyperedge embeddings from the second type of random walk to train a neural network to create an embedding for the unlabeled vertex.

2. The method of claim 1, wherein the first type of random walk is a Subsample and Traverse (SaT) random walk, and wherein the second type of random walk is a Traverse and Select (TaS) random walk.

3. The method of claim 2, wherein the SaT random walk passes through every vertex in the hypergraph of vertices.

4. The method of claim 2, wherein the TaS random walk passes through every hyperedge in the hypergraph of hyperedges.

5. The method of claim 1, further comprising:
creating, by the trained neural network, the embedding for the unlabeled vertex from the set of vertex embeddings and the set of hyperedge embeddings.

6. The method of claim 1, wherein the neural network is a deep neural network, and wherein the embedding for the unlabeled vertex is an output of the deep neural network.

7. The method of claim 1, further comprising:
generating vector representations of known vertices in the hypergraph;
generating a vector representation of the unlabeled vertex;
matching the vector representation of the unlabeled vertex to a matching vector representation from the vector representations of the known vertices in the hypergraph;
extracting one or more matching feature vectors from the matching vector representation; and
adding the one or more matching feature vectors to the embedding for the unlabeled vertex.

8. A computer program product comprising a computer readable storage medium having program code embodied therewith, wherein the computer readable storage medium is not a transitory signal per se, and wherein the program code is readable and executable by a processor to perform a method comprising:
receiving a hypergraph of hyperedges, wherein each of the hyperedges comprises one or more vertices, and wherein at least one of the hyperedges comprises an unlabeled vertex;
generating a hypergraph of vertices from the hypergraph of hyperedges, wherein each of the vertices in the hypergraph of vertices comprises one or more of the one or more hyperedges from the hypergraph of hyperedges;
performing a first type of random walk through the hypergraph of hyperedges;
performing a second type of random walk through the hypergraph of vertices;
generating a set of vertex embeddings from the first type of random walk and a set of hyperedge embeddings from the second type of random walk; and
utilizing a training set of vertex embeddings and a training set of hyperedge embeddings that are respectively similar to the set of vertex embeddings from the first type of random walk and the set of hyperedge embeddings from the second type of random walk to train a neural network to create an embedding for the unlabeled vertex.

9. The computer program product of claim 8, wherein the first type of random walk is a Subsample and Traverse (SaT) random walk, and wherein the second type of random walk is a Traverse and Select (TaS) random walk.

10. The computer program product of claim 9, wherein the SaT random walk passes through every vertex in the hypergraph of vertices.

11. The computer program product of claim 9, wherein the TaS random walk passes through every hyperedge in the hypergraph of hyperedges.

12. The computer program product of claim 8, wherein the method further comprises:
creating, by the trained neural network, the embedding for the unlabeled vertex from the set of vertex embeddings and the set of hyperedge embeddings.

13. The computer program product of claim 8, wherein the neural network is a deep neural network, and wherein the embedding for the unlabeled vertex is an output of the deep neural network.

14. The computer program product of claim 8, wherein the method further comprises:
generating vector representations of known vertices in the hypergraph;
generating a vector representation of the unlabeled vertex;
matching the vector representation of the unlabeled vertex to a matching vector representation from the vector representations of the known vertices in the hypergraph;
extracting one or more matching feature vectors from the matching vector representation; and
adding the one or more matching feature vectors to the embedding for the unlabeled vertex.

15. The computer program product of claim 8, wherein the program code is provided as a service in a cloud environment.

16. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
receiving a hypergraph of hyperedges, wherein each of the hyperedges comprises one or more vertices, and wherein at least one of the hyperedges comprises an unlabeled vertex;
generating a hypergraph of vertices from the hypergraph of hyperedges, wherein each of the vertices in the hypergraph of vertices comprises one or more of the one or more hyperedges from the hypergraph of hyperedges;
performing a first type of random walk through the hypergraph of hyperedges;
performing a second type of random walk through the hypergraph of vertices;

generating a set of vertex embeddings from the first type of random walk and a set of hyperedge embeddings from the second type of random walk; and utilizing a training set of vertex embeddings and a training set of hyperedge embeddings that are respectively similar to the set of vertex embeddings from the first type of random walk and the set of hyperedge embeddings from the second type of random walk to train a neural network to create an embedding for the unlabeled vertex.

17. The computer system of claim 16, wherein the first type of random walk is a Subsample and Traverse (SaT) random walk, and wherein the second type of random walk is a Traverse and Select (TaS) random walk.

18. The computer system of claim 16, wherein the method further comprises:

creating, by the trained neural network, the embedding for the unlabeled vertex from the set of vertex embeddings and the set of hyperedge embeddings.

19. The computer system of claim 16, wherein the method further comprises:

generating vector representations of known vertices in the hypergraph;

generating a vector representation of the unlabeled vertex;

matching the vector representation of the unlabeled vertex to a matching vector representation from the vector representations of the known vertices in the hypergraph;

extracting one or more matching feature vectors from the matching vector representation; and adding the one or more matching feature vectors to the embedding for the unlabeled vertex.

20. The computer system of claim 16, wherein the program code is provided as a service in a cloud environment.

* * * * *